US012706631B2

(12) United States Patent
Wei et al.

(10) Patent No.: US 12,706,631 B2
(45) Date of Patent: Aug. 11, 2026

(54) FEED CIRCUIT, ANTENNA DEVICE, COMMUNICATION DEVICE, AND COMMUNICATION SYSTEM UTILIZING A POWER DIVIDER AND PHASE SHIFT ELEMENTS

(71) Applicant: HUAWEI TECHNOLOGIES CO., LTD., Shenzhen (CN)

(72) Inventors: Xiaodong Wei, Xi'an (CN); Peifeng Hu, Xi'an (CN); Zhiguo Huang, Dongguan (CN); Mengyao Mi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 18/648,335

(22) Filed: Apr. 27, 2024

(65) Prior Publication Data

US 2024/0283483 A1 Aug. 22, 2024

Related U.S. Application Data

(63) Continuation of application No. PCT/CN2022/125559, filed on Oct. 17, 2022.

(30) Foreign Application Priority Data

Oct. 27, 2021 (CN) ........................ 202111253894.1

(51) Int. Cl.
*H04B 1/00* (2006.01)
*H01Q 5/335* (2015.01)
*H04B 1/10* (2006.01)
*H04B 1/525* (2015.01)

(52) U.S. Cl.
CPC ............. *H04B 1/525* (2013.01); *H01Q 5/335* (2015.01); *H04B 1/1027* (2013.01)

(58) Field of Classification Search
CPC ...... H04B 1/525; H04B 1/1027; H01Q 5/335; H01Q 3/26; H01Q 1/002; H01Q 1/246; H01P 1/18; H01P 1/22; H01P 5/12
See application file for complete search history.

(56) References Cited

U.S. PATENT DOCUMENTS

2005/0270123 A1* 12/2005 Chiang .................. H01P 1/185 333/164
2024/0151825 A1* 5/2024 Dupont .................. H03F 3/087

FOREIGN PATENT DOCUMENTS

CN 201379631 1/2010
CN 201430200 3/2010
CN 101702771 A 5/2010
CN 103441735 A 12/2013
CN 107947755 A 4/2018
CN 108352978 A 7/2018
CN 111771345 10/2020
EP 3410532 B1 * 3/2020 ......... H01Q 21/0006
EP 3905552 A1 * 11/2021 ........... H04B 17/221
GB 1194210 6/1970

(Continued)

*Primary Examiner* — Pakee Fang

(57) ABSTRACT

Disclosed embodiments provide a feed circuit, an antenna device, a communication device, and a communication system that are configured to improve passive intermodulation (PIM). In the feed circuit, phase shift elements are disposed along a plurality of parallel branches to cancel PIM caused by semiconductor components in semiconductor modules in the branches.

20 Claims, 7 Drawing Sheets

(56) References Cited

FOREIGN PATENT DOCUMENTS

| | | | |
|---|---|---|---|
| JP | 2003046344 | A | 2/2003 |
| WO | 2016205995 | A1 | 12/2016 |

* cited by examiner (a)

(b)

FEED CIRCUIT, ANTENNA DEVICE, COMMUNICATION DEVICE, AND COMMUNICATION SYSTEM UTILIZING A POWER DIVIDER AND PHASE SHIFT ELEMENTS

CROSS-REFERENCE TO RELATED APPLICATIONS

This filing is a continuation of International Application No. PCT/CN2022/125559 filed on Oct. 17, 2022, which claims priority to Chinese Patent Application No. 202111253894.1 filed on Oct. 27, 2021. The disclosures of the aforementioned applications are hereby incorporated by reference in their entireties.

TECHNICAL FIELD

Disclosed embodiments relate to the radio field, and in particular, to a feed circuit, an antenna device, a communication device, and a communication system.

BACKGROUND

Passive intermodulation (PIM) is interference generated by nonlinearity of radio frequency (RF) transmission components in a wireless system. When two electrical signals are mixed together, due to mutual impact between the two electrical signals, an electrical signal whose frequency is equal to a sum of or a difference between frequencies of the two electrical signals is generated. When the generated electrical signal falls within a frequency band of an electrical signal that is expected to be received, PIM occurs, and a received signal is distorted. This affects an uplink throughput rate.

Currently, in a base station device, a feed circuit of the base station device includes a digital phase shifter designed based on a semiconductor component, and an indicator used by the semiconductor component to measure linearity is a third-order intercept point (IP3), and the indicator is low. Consequently, a PIM indicator of an entire phase shifter circuit in the feed circuit is low. In this case, to ensure that a frequency division duplex (FDD) antenna can be applied, a receiving/transmitting separation architecture needs to be used, to add an additional filter to reduce impact of PIM on receiving. This architecture has great impact on the layout and costs of the base station device. In addition, due to limitations of materials and processes of semiconductors, it is difficult to improve an IP3 of the semiconductor. Therefore, it is a technical direction to study a specific feed circuit structure to improve the PIM indicator.

SUMMARY

This disclosure provides a feed circuit, an antenna device, a communication device, and a communication system. In the feed circuit, phase shift elements are disposed on a plurality of parallel branches, so that PIM caused by semiconductor components in semiconductor modules in the branches can be cancelled each other. This improves a PIM indicator of the feed circuit.

According to a first aspect, a feed circuit is provided, including a power divider and N branches, where N is an integer greater than or equal to 2; the power divider includes one input port and M output ports, where M is an integer greater than or equal to N; the N branches are respectively connected to N output ports of the M output ports of the power divider; a semiconductor module is disposed on each of the N branches; and the N branches include N−1 first branches and one second branch, a first phase shift element is disposed on each of the N−1 first branches, the first phase shift element is disposed between the semiconductor module and the power divider, and the N−1 first phase shift elements are configured to generate a fixed phase difference between the N branches.

According to technical solutions in embodiments of this disclosure, the second branch may be any one of the N branches of the feed circuit. A phase shift element is disposed on each first branch in the N−1 first branches, the phase shift element on each first branch is disposed between the semiconductor module on the first branch and a power divider 110, and phase shift elements on the N−1 first branches separately perform phase adjustment on electrical signals that flow through the N−1 first branches, so that the fixed phase difference may be generated between the N branches. The fixed phase difference generated between the N branches may be used to cancel PIM caused by the semiconductor components in the semiconductor modules in the branches, to improve a PIM indicator of the feed circuit.

In some embodiments of the first aspect, the second branch serves as a reference branch whose phase returns to zero in the N branches.

In some embodiments, the second branch serves as the reference branch whose phase returns to zero in the N branches and is configured to select a zero-degree phase.

With reference to the first aspect, in some implementations, a second phase shift element is disposed on the second branch.

According to technical solutions in embodiments, a phase reference in the N branches may be adjusted by adjusting the phase $\alpha$ of the phase shift element disposed on the second branch.

With reference to the first aspect, in some implementations, a phase of a first phase shift element disposed on an $i^{th}$ first branch in the N−1 first branches is $i\times\Phi/N+\alpha$, i is an integer greater than or equal to 1 and less than or equal to N−1, $\Phi$ is greater than 90° and less than 270°, $\alpha$ is a phase of the second phase shift element, and $\alpha$ is greater than or equal to 0.

With reference to the first aspect, in some implementations, a phase of a first phase shift element disposed on an $i^{th}$ first branch in the N−1 first branches is $i\times\Phi/N$, i is an integer greater than or equal to 1 and less than or equal to N−1, and $\Phi$ is greater than 90° and less than 270°.

According to technical solutions in embodiments of this disclosure, a phase difference $\Phi$ between a first PIM signal and a second PIM signal needs to be greater than 90° and less than 270°, so that the first PIM signal may include a component in a first direction. The first direction is a direction in which a vector whose phase difference with the second PIM signal is 180° is located, that is, the first direction is reverse to the second PIM signal. The component of the first PIM signal in the first direction and the second PIM signal may at least partially cancel each other.

With reference to the first aspect, in some implementations, $\Phi$ is 180°.

With reference to the first aspect, in some implementations, the power divider is an equal-amplitude power divider.

According to technical solutions in embodiments of this disclosure, when the power divider 110 is an equal-amplitude power divider and $\Phi$ is 180°, the fixed phase difference may be generated between the N branches by using the N−1 phase shift elements, so that a vector sum of N PIM signals is 0, the N PIM signals completely cancel each other, and a PIM magnitude of an entire feed network is the lowest.

With reference to the first aspect, in some implementations, the feed circuit further includes a power combiner, where the power combiner includes P input ports and one output port, and P is an integer greater than or equal to N; the N branches are further respectively connected to N input ports of the P input ports of the power combiner; and a third phase shift element is further disposed on each of the N branches, the third phase shift element is disposed between the semiconductor module and the power combiner, and the N third phase shift elements are configured to enable phases of electrical signals transmitted on the N branches to be the same at input ports of the power combiner.

According to technical solutions in embodiments of this disclosure, when the semiconductor module includes a digital phase shifter, the feed circuit serves as a phase shift circuit, and is configured to adjust a phase of an electrical signal fed into an input port. In addition, because the feed circuit provided in this embodiment of this disclosure is split first and then combined, the N branches are disposed between the power divider and the power combiner, and a power capacity of the semiconductor module on each branch remains unchanged. Compared with a phase shift circuit that includes only a single branch, the phase shift circuit provided in this embodiment of this disclosure has an increased power capacity.

With reference to the first aspect, in some implementations, sums of phases of the first phase shift elements disposed on the N−1 first branches and a phase of the corresponding second phase shift element each are θ, and θ is greater than or equal to 0° and less than or equal to 360°.

According to technical solutions in embodiments of this disclosure, there may be a plurality of phase setting manners of the third phase shift element. A purpose is that: sums of phases of first phase shift elements or the phase of the second phase shift element disposed on the N branches and phases of the corresponding third phase shift elements are θ. This avoids a power loss caused by different phases that are of electrical signals transmitted on the N branches and that are on the input ports of the power combiner during power combination.

With reference to the first aspect, in some implementations, the semiconductor module is a digital phase shifter.

With reference to the first aspect, in some implementations, the digital phase shifter includes a diode or a micro-electro-mechanical system.

According to technical solutions in embodiments of this disclosure, the semiconductor module may be a digital phase shifter, and may be configured to adjust phases for electrical signals transmitted on the N branches.

With reference to the first aspect, in some implementations, the third phase shift element is a delay line or a Schiffman phase shifter.

With reference to the first aspect, in some implementations, the first phase shift element is a delay line or a Schiffman phase shifter.

According to technical solutions in embodiments of this disclosure, the first phase shift element, the second phase shift element, and the third phase shift element are the same as phase shift elements shown in FIG. 4, and the first phase shift element and the second phase shift element are a delay line, a Schiffman phase shifter, or another structure that generates a phase difference. This is not limited in this disclosure.

According to a second aspect, an antenna device is provided, including the feed circuit according to any one of the first aspect.

With reference to the second aspect, in some implementations, a radiator of the antenna device is connected to the input port of the power divider in the feed circuit.

According to a third aspect, a communication device is provided, including the antenna device according to any one of the second aspect.

According to a fourth aspect, a communication system is provided, including the communication device according to the third aspect.

It may be understood that the antenna device, the communication device, and the communication system that are provided above include all content of the feed circuit provided above. Therefore, for beneficial effects that can be achieved by the antenna device, the communication device, and the communication system, refer to the beneficial effects of the feed circuit provided above. Details are not described herein again.

DESCRIPTION OF EMBODIMENTS

The following describes technical solutions of this disclosure with reference to accompanying drawings.

Figure 1:
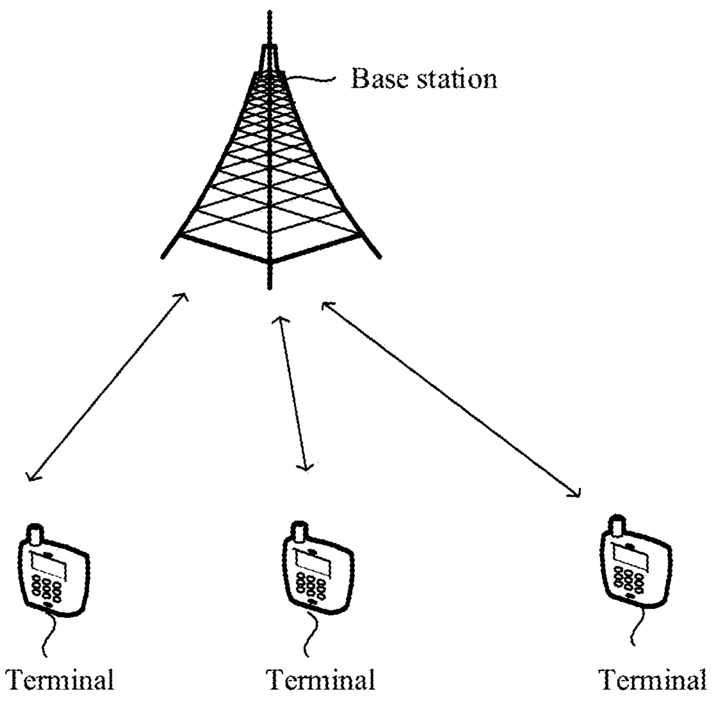
FIG. 1 is a schematic diagram of a communication system according to an embodiment of this disclosure.

For ease of understanding of technical solutions provided in embodiments of this disclosure, the following describes an application scenario of the technical solutions. FIG. 1 shows an example. As shown in FIG. 1, the application scenario may include a base station and a terminal. Wireless communication may be implemented between the base station and the terminal. The base station may be located in a base station subsystem (BSS), a terrestrial radio access network (UTRAN), or an evolved terrestrial radio access network (E-UTRAN), and is configured to perform cell coverage of a radio signal to implement communication between a terminal device and a wireless network. Specifically, the base station may be a base transceiver station (BTS) in a global system for mobile communication (GSM)

or a code division multiple access (CDMA) system, or may be a NodeB (NB) in a wideband code division multiple access (WCDMA) system, or may be an evolved Node B (eNB, or eNodeB) in a long term evolution (LTE) system, or may be a radio controller in a cloud radio access network (CRAN) scenario. Alternatively, the base station may be a relay station, an access point, a vehicle-mounted device, a wearable device, a g node (a gNB) in a new radio (NR) system, a base station in a future evolved network, or the like. This is not limited in embodiments of this disclosure.

Figure 2:
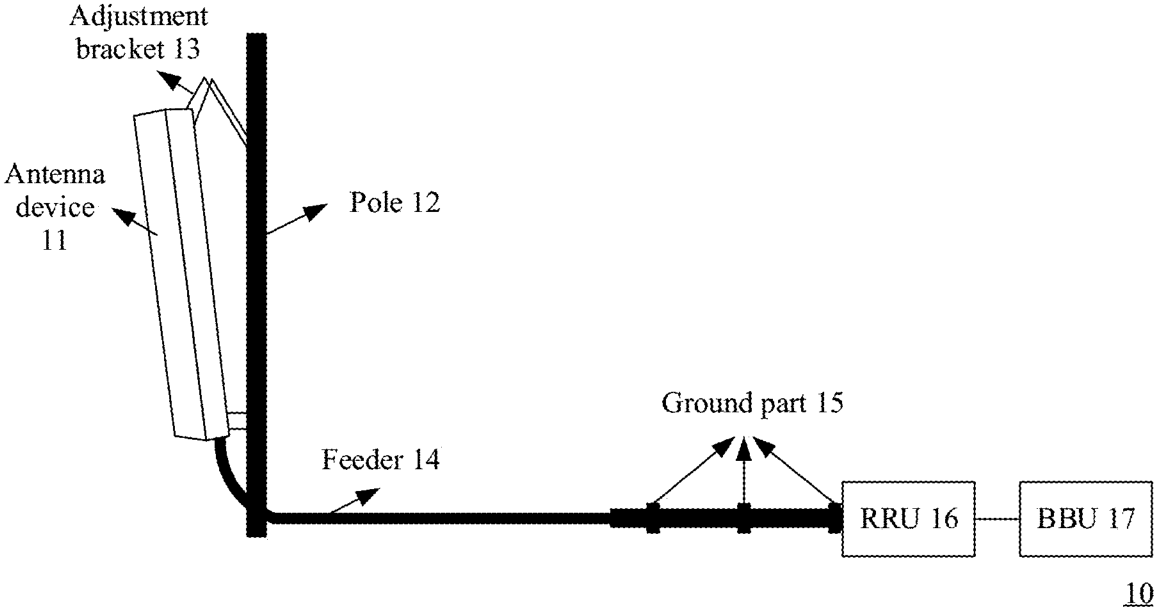
FIG. 2 is a schematic diagram of a structure of a communication device 10 according to an embodiment of this disclosure.

FIG. 2 is a schematic diagram of a structure of a communication device 10 according to an embodiment of this disclosure.

As shown in FIG. 2, the communication device 10 may include an antenna device 11, a pole 12, an adjustment bracket 13, a feeder 14, a ground part 15, a remote radio unit (RRU) 16, and a baseband processing unit (BBU) 17. It should be understood that the communication device 10 may be the base station shown in FIG. 1, and the communication device 10 may be used in the foregoing communication systems.

The antenna device 11 may be an antenna device in the communication device 10, and is configured to transmit and receive electrical signals. The adjustment bracket 13 is configured to fasten the antenna device 11 to the pole 12, and may adjust a relative location between the antenna device 11 and the pole, so that the antenna device 11 is disposed at a proper working location. One end of the feeder 14 is connected to the antenna device 11, and is configured to: transmit an electrical signal received by the antenna device 11 to the RRU 16 for frequency selection, amplification, and down-conversion processing, convert the electrical signal into an intermediate frequency signal or a baseband signal, and send the intermediate frequency signal or the baseband signal to the BBU 17; or configured to transmit an electrical signal that is from the RRU 16 and on which up-conversion and amplification processing are performed to the antenna device 11. The ground part 15 is disposed at the other end of the feeder 14, and is configured to connect to the ground and filter out some interference signals. The BBU 17 may be connected to a feed network of the antenna device 11 through the RRU 16. The RRU 16 and the BBU 17 are configured to perform radio frequency and baseband related processing on the electrical signal.

In addition, a sealing part may be disposed at a location at which the feeder 14 is connected to the antenna device 11 or the ground part 15, and may be an insulation sealing tape, for example, a polyvinyl chloride (PVC) insulation tape, to prevent a short circuit at a joint of the sealing part from affecting working of the communication system 10.

FIG. 2 shows only some components included in the communication system 10 as an example, and actual shapes, actual sizes, and actual structures of these components are not limited by

FIG. 2.

Figure 3:
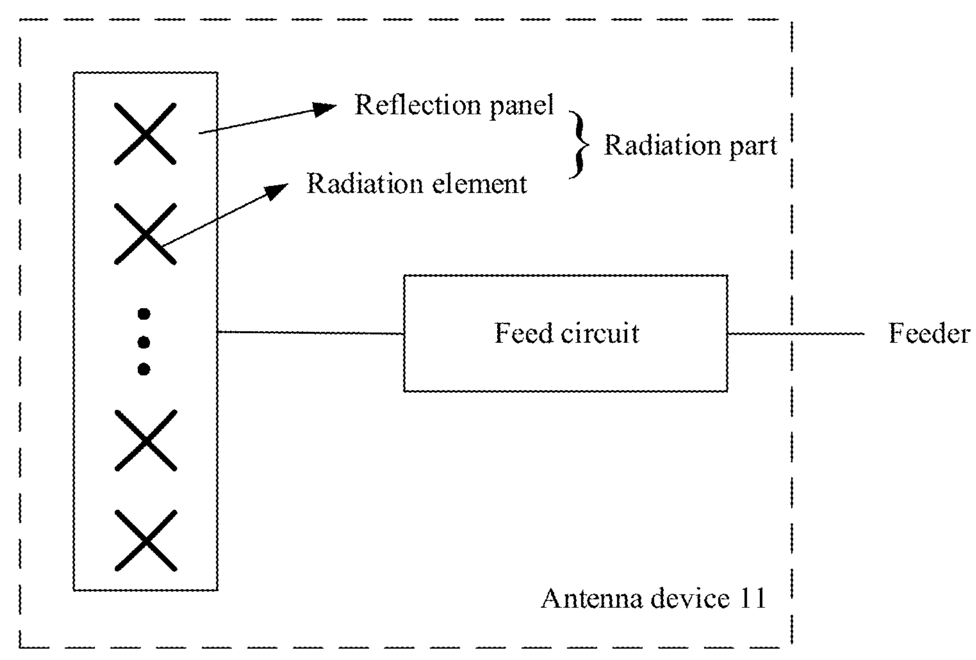
FIG. 3 is a schematic diagram of an internal structure of an antenna device 11 according to an embodiment of this disclosure.

FIG. 3 is a schematic diagram of an internal structure of an antenna device 11 according to an embodiment of this disclosure.

As shown in FIG. 3, the antenna device 11 may include a radiation part and a feed circuit.

The feed circuit may be configured to connect the radiation part of the antenna device to an external feeder. The feed circuit may be configured to: process an electrical signal transmitted by the feeder, and transmit a processed electrical signal of a specific amplitude and phase to the radiation part, so that the radiation part radiates the processed electrical signal to the outside. Alternatively, the feed circuit may be configured to: process an electrical signal received by the radiation part, and transmit a processed electrical signal of a specific amplitude and phase to the feeder. The feed circuit may include an electronic component like a phase shifter, a combiner, or a filter, and is configured to process an amplitude and a phase of an electrical signal.

The radiation part of the antenna device may include at least one independent antenna array, and the antenna array may include a plurality of radiation elements and a reflection panel. The reflection panel may also be referred to as a baseplate, an antenna panel, or a reflection surface, and a material of the reflection panel may be metal, for example, copper. The plurality of radiation elements may be disposed above the metal reflection panel, and the radiation elements may also be referred to as radiators. The reflection panel may be configured to improve receiving sensitivity of the radiation part of the antenna device. For example, the reflection panel may reflect and aggregate a received electrical signal at a receiving point of the radiation part, and reflect a transmitted electrical signal. This greatly enhances a capability of receiving and transmitting electrical signals of the radiation part, and may further suppress interference of another radio wave to a received signal, for example, may suppress an interference signal generated by a back-end circuit. In addition, operating frequencies of the plurality of radiation elements may be the same, to form a multiple-in multiple-out (MIMO) technology, and the technology is applied to 5G and another communication system. Alternatively, operating frequencies of the plurality of radiation elements may be different. This is not limited in this disclosure.

Further, the antenna device 11 may include a radome, and both the radiation part and the feed circuit may be disposed in space formed by the radome, to avoid interference from an external environment.

It should be understood that the antenna device 11 shown in FIG. 3 includes the passive radiation part and the feed circuit, and may be used as a passive antenna feed part of a communication device. During actual application, the antenna device 11 may include the RRU 16 shown in FIG. 2, to form an active antenna feed part. The BBU 17 is located at a remote end of the antenna device 11. This is not limited in this disclosure.

In an FDD mode of an antenna device, a feed circuit of the antenna device includes an electronic component designed based on a semiconductor component. As described above, to ensure that communication performance is not affected by PIM, receiving/transmitting separation is usually used or a software algorithm is used to compensate for the PIM. This greatly affects a layout and costs in the antenna device.

Embodiments of this disclosure provide a feed circuit, an antenna device, a communication device, and a communication system. In the feed circuit, phase shift elements are disposed on a plurality of parallel branches, so that PIM caused by semiconductor components in semiconductor modules in the branches can cancel each other. This improves a PIM indicator of the feed circuit. In addition, in the FDD mode, a receiving/transmitting separation architecture does not need to be used. This reduces a layout difficulty and costs in the antenna device. In addition, in the feed circuit, signal compensation does not need to be performed on the PIM by using a software algorithm. This reduces algorithm complexity of the system.

Figure 4:
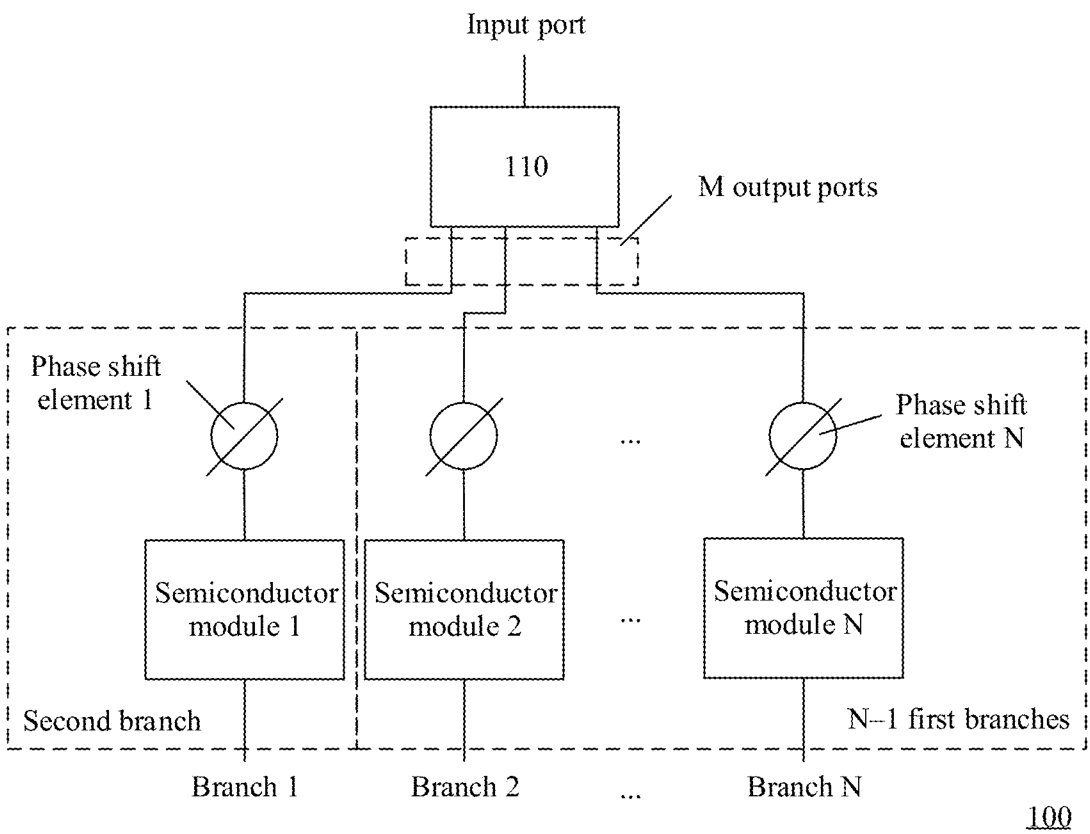
FIG. 4 is a schematic diagram of a structure of a feed circuit 100 according to an embodiment of this disclosure.

FIG. 4 is a schematic diagram of a structure of a feed circuit 100 according to an embodiment of this disclosure. The feed circuit 100 may be applied to the antenna device 11 shown in FIG. 2. The feed circuit 100 shown in FIG. 4 may be a part of the feed circuit in the antenna device 11 shown in FIG. 2, and is configured to implement some functions of the feed circuit.

As shown in FIG. 4, the feed circuit 100 may include a power divider 110 and N branches (namely, a branch 1, a branch 2, . . . , and a branch N), where N is an integer greater than or equal to 2. The power divider 110 includes one input port and M output ports, and M is an integer greater than or equal to N. In the structure shown in FIG. 4, M=N is used for description. One end of each of the N branches is connected to each of N output ports of the M output ports of the power divider. A semiconductor module is disposed on each of the N branches. The N branches may include N−1 first branches and one second branch. A phase shift element (for example, a phase shift element 2 to a phase shift element N in FIG. 4) is disposed on each first branch in the N−1 first branches, the phase shift element on each first branch is disposed between the semiconductor module on the first branch and the power divider 110, and phase shift elements on the N−1 first branches respectively perform phase adjustment on electrical signals that flow through the N−1 first branches, so that a fixed phase difference may be generated between the N branches.

It should be understood that the second branch may be any one of the N branches of the feed circuit 100. This is not limited in this disclosure. For brevity of description, in this embodiment of this disclosure, the branch 1 shown in FIG. 4 serves as the second branch for description. In addition, the semiconductor module may include a semiconductor component. For example, the semiconductor module may include a digital phase shifter that may be applied to a phase shift circuit and that is configured to adjust phases of electrical signals transmitted on the N branches. Alternatively, the semiconductor module may include an amplifier that may be applied to an amplification circuit, or may include another type of semiconductor component that is applied to another functional circuit. This is not limited in this disclosure and may be adjusted based on an actual production or design requirement.

In an implementation, the second branch serves as a reference branch whose phase returns to zero in the N branches, and is configured to select a zero-degree phase. It should be understood that, a phase obtained when an electrical signal on the second branch is transmitted to the semiconductor module through the output port of the power divider 110 serves as a phase reference, and phases are set for the phase shift elements on the N−1 first branches of the N branches, so that the fixed phase difference is generated between the N branches. For example, when no phase shift element is disposed on the second branch, the phase reference in the N branches is 0, and phases are set for the phase shift elements on the N−1 first branches by using 0 as the phase reference. When a phase shift element is disposed on the second branch, a phase of the phase shift element is 90°, the phase reference in the N branches is 90°, and phases are set for the phase shift elements on the N−1 first branches by using 90° as the phase reference.

In an implementation, as shown in FIG. 4, a phase shift element 1 is disposed on the second branch, and a phase of the phase shift element 1 disposed on the second branch may be $\alpha$, where $\alpha$ is greater than or equal to 0. The phase reference in the N branches may be adjusted by adjusting the phase $\alpha$ of the phase shift element 1 disposed on the second branch. A phase of a phase shift element may be understood as a phase increment obtained after an electrical signal passes through the phase shift element. Correspondingly, the second branch serves as the reference branch, and phases of the phase shift elements in the N−1 first branches are respectively $\Phi/N+\alpha$, $2\times\Phi/N+\alpha$, $3\times\Phi/N+\alpha$, . . . , and $(N-1)\times\Phi/N+\alpha$, where $\Phi$ is greater than 90° and less than 270°, to at least partially cancel PIM signals generated by the semiconductor modules in the N branches. A specific principle is described below. In this implementation, it may be considered that a phase of a phase shift element disposed on an $i^{th}$ first branch in the N−1 first branches is $i\times\Phi/N+\alpha$, where i is an integer greater than or equal to 1 and less than or equal to N−1. For a sequence of the N−1 first branches mentioned above, it should be understood that the N−1 first branches may be arranged on a printed circuit board (PCB) in a phase sequence (a sequence of phases of the phase shift elements, for example, an ascending order or a descending order of the phases), or may be arranged randomly, provided that the sequence is recorded for identification. A specific layout manner of the N−1 first branches is not limited in this embodiment of this disclosure, and a flexible layout may be performed based on an actual design.

In an implementation, no phase shift element is disposed on the second branch. This is equivalent to that the phase $\alpha$ of the phase shift element disposed on the second branch in the foregoing embodiment is 0. This reduces a layout difficulty and costs in the antenna device. Correspondingly, the second branch serves as the reference branch, and phases of first phase shift elements in the N−1 first branches are $\Phi/N$, $2\times\Phi/N$, $3\times\Phi/N$, . . . , and $(N-1)\times\Phi/N$, where $\Phi$ is greater than 90° and less than 270°, to at least partially cancel PIM signals generated by the semiconductor modules in the N branches. That is, a phase of a phase shift element disposed on an $i^{th}$ first branch in the N−1 first branches is $i\times\Phi/N$, where i is an integer greater than or equal to 1 and less than or equal to N−1. The foregoing formula is used to set phases for the phase shift elements on the N−1 first branches, to facilitate calculation and facilitate generation of the fixed phase difference between the N branches.

In an implementation, the semiconductor module may be a digital phase shifter, and may be configured to adjust phases for electrical signals transmitted on the N branches. In another embodiment of this disclosure, this may also be correspondingly understood. When the semiconductor module includes a digital phase shifter, the digital phase shifter includes a diode or a micro electromechanical system (MEMS), or may include another electronic component based on an actual design. This is not limited in this disclosure.

In an implementation, the phase shift elements mentioned above are a delay line, a Schiffman phase shifter, or another structure or device that generates a phase difference. This is not limited in this disclosure.

In an implementation, the power divider 110 is an equal-amplitude power divider, and is configured to: divide an electrical signal fed into the input port into N electrical signals that have an equal amplitude and a same phase, and transmit the N electrical signals to the N branches. In another implementation, the power divider 110 is an unequal-amplitude power divider, and is configured to: divide an electrical signal fed into the input port into N electrical signals that have a same phase but different amplitudes, and transmit the N electrical signals to the N branches. This is not limited in this disclosure.

In an implementation, the input port of the power divider 110 is electrically connected to the radiator shown in FIG. 3, and is configured to: divide an electrical signal received by the radiator in the antenna device into N electrical signals that have a same phase, and transmit the N electrical signals to the N branches. Alternatively, the input port of the power divider 110 is electrically connected to another part of the feed circuit 100. This is not limited in this disclosure. It should be understood that the feed circuit 100 shown in FIG. 4 serves as a power division circuit, and is configured to allocate power of an electrical signal fed into the input port to the N branches. In addition, the other end (an end that is not connected to the power divider) of each of the N branches may be connected to another functional circuit in the feed network, for example, electrically connected to a frequency modulation circuit. This is not limited in this disclosure. Alternatively, the input port of the power divider 110 is electrically connected to the RRU 16 shown in FIG. 2, and is configured to: divide an electrical signal processed by the RRU 16 into N electrical signals that have a same phase, and transmit the N electrical signals to the N branches, to provide an electrical signal radiated to the outside for the radiator in the antenna device. In embodiments of this disclosure, an example in which an antenna radiator receives a signal is used for description. A person skilled in the art may understand that the technical solutions in embodiments of this disclosure may alternatively be applied to a scenario in which an antenna radiator transmits a signal and are implemented by using embodiments disclosed in this disclosure without creative efforts.

In addition, the feed circuit provided in embodiments of this disclosure may be applied to an antenna device to feed a radiator and may be applied to an RRU or a BBU in a communication system. Alternatively, the feed circuit may be applied to a radio frequency circuit or a baseband circuit of another device, for example, a terminal device.

Figure 5:
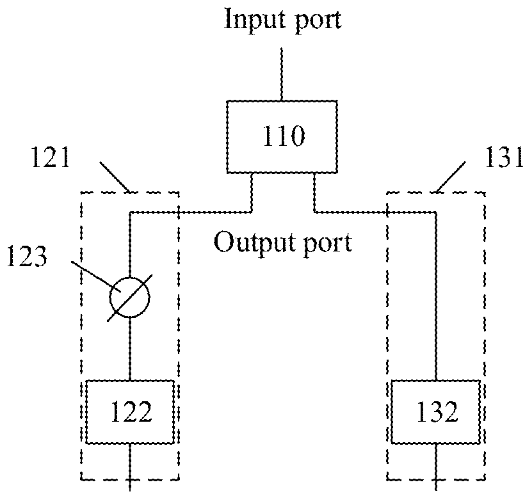
FIG. 5 is a schematic diagram of a structure of another feed circuit according to an embodiment of this disclosure.

In an embodiment shown in FIG. 5, that M=N=2 and no phase shift element is disposed on a second branch 131 is used for description. That is, in the embodiment shown in FIG. 5, a power divider 110 is a one-to-two power divider, that is, has one input end and two output ends. A feed circuit 100 includes a first branch 121 and the second branch 131. One end of the first branch 121 and one end of the second branch 131 are respectively connected to the two output ports of the power divider 110. A semiconductor module 122 and a phase shift element 123 are disposed on the first branch 121, and the phase shift element 123 is disposed between the semiconductor module 122 and the power divider 110. A semiconductor module 132 is disposed on the second branch 131.

Figure 6:
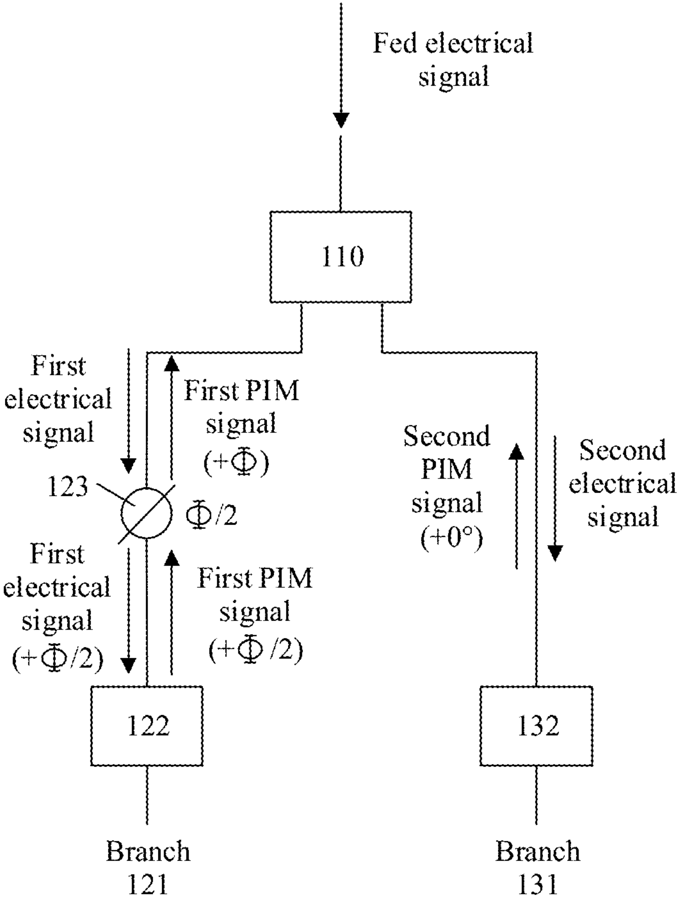
FIG. 6 is a schematic diagram of transmitting electrical signals by a feed circuit according to an embodiment of this disclosure.

As described above, when N=2, the feed circuit 100 includes one first branch 121 and one second branch 131. When no phase shift element is disposed on the second branch 131, a phase of the phase shift element 123 disposed on the first branch 121 is $i \times \Phi/N$, and when i=1, and N=2, a phase of the phase shift element 123 is $\Phi/2$, as shown in FIG. 6. An electrical signal fed into the input port of the power divider 110 is divided into a first electrical signal and a second electrical signal that have a same phase, and the first electrical signal and the second electrical signal are respectively fed into the first branch 121 and the second branch 131. After the first electrical signal and the second electrical signal separately pass through the phase shift element 123, the phase of the first electrical signal increases by $\Phi/2$. Because no phase shift element is disposed on the second branch 131, no phase is increased to the second electrical signal, and a phase difference between the first electrical signal and the second electrical signal is $\Phi/2$, the first electrical signal and the second electrical signal are respectively transmitted to the semiconductor module 122 and the semiconductor module 132, and a reflected first PIM signal and a reflected second PIM signal are respectively generated. It should be noted that the PIM signal herein may be understood as a parameter representation corresponding to interference generated by PIM. Because the first PIM signal and the second PIM signal are generated by reflecting the first electrical signal and the second electrical signal at the semiconductor modules, phases of the first PIM signal and the second PIM signal are the same as phases of the first electrical signal and the second electrical signal transmitted to the semiconductor modules. Correspondingly, a phase difference between the first PIM signal and the second PIM signal is the same as the phase difference between the first electrical signal and the second electrical signal transmitted to the semiconductor modules, and is $\Phi/2$. However, in paths in which the first PIM signal and the second PIM signal are transmitted to the output ports of the power divider 110, the first PIM signal and the second PIM signal need to pass through the phase shift element 123, and a phase of the first PIM signal increases by $\Phi/2$. Because no phase shift element is disposed on the second branch 131, no phase is increased in a path in which the second PIM signal is reflected by the semiconductor module 132 to the output port of the power divider 110. Therefore, a phase difference between the first PIM signal and the second PIM signal at the output port of the power divider 110 is $\Phi$.

Figure 7:
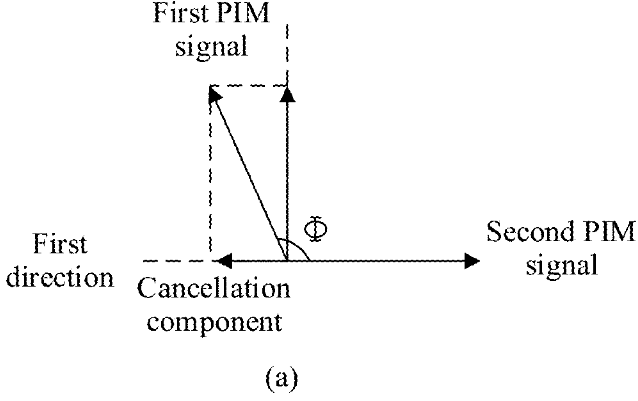
FIG. 7 is a schematic diagram of vector synthesis according to an embodiment of this disclosure.
Figure 7:
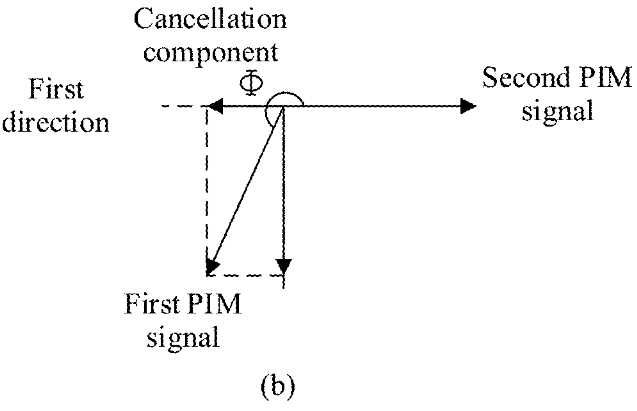

At the output ports of the power divider 110, vector synthesis of the first PIM signal and the second PIM signal is shown in FIG. 7. To enable at least partial cancellation between the first PIM signal and the second PIM signal, to improve a PIM indicator of the entire feed network, the first PIM signal may include a component in a first direction. The first direction is a direction in which a vector whose phase difference with the second PIM signal is 180° is located, that is, the first direction is reverse to the second PIM signal. The component of the first PIM signal in the first direction and the second PIM signal may at least partially cancel each other. As shown in (a) in FIG. 7, when $\Phi$ is between 0° and 180°, and $\Phi$ is greater than 90° and less than or equal to 180°, the first PIM signal includes a component in the first direction. As shown in (b) in FIG. 7, when $\Phi$ is between 180° and 360°, and when $\Phi$ is greater than or equal to 180° and is less than 270, the first PIM signal includes a component in the first direction. In this case, the phase difference $\Phi$ between the first PIM signal and the second PIM signal needs to be greater than 90° and less than 270°, so that the first PIM signal may include the component in the first direction.

Therefore, when the first PIM signal and the second PIM signal have an equal amplitude and inverse phases (amplitudes are the same, and the phase difference is 180°), the first PIM signal and the second PIM signal completely cancel each other, and a PIM magnitude of the feed network is the lowest. Correspondingly, to enable the first PIM signal and the second PIM signal to have the equal amplitude and the inverse phases, the power divider 110 is set as an equal-amplitude power divider, so that the first PIM signal and the second PIM signal have the equal amplitude and $\Phi$ is 180°, so that the first PIM signal and the second PIM signal have the inverse phases (the phase difference is 180°), and a sum of vectors of the first PIM signal and the second PIM signal is zero.

Similarly, for the feed network including the N branches, N PIM signals generated by the semiconductor modules in the N branches are reflected to the output ports of the power divider 110, a phase of a PIM signal on the second branch is 0, and phases of PIM signals in the first branch are respectively $2 \times \Phi/N$, $4 \times \Phi/N$, $6 \times \Phi/N$, to $2 \times (N-1) \times \Phi/N$, that is, a phase of a PIM signal on the $i^{th}$ first branch is $2i \times \Phi/N$. It can be learned from the vector synthesis that when $\Phi$ is greater than 90° and less than 270°, the N PIM signals in the N branches may at least partially cancel each other, to improve the PIM indicator of the entire feed network. When the power divider 110 is an equal-amplitude power divider and Φ is 180°, the fixed phase difference may be generated between the N branches by using the N−1 phase shift elements, so that a vector sum of N PIM signals is 0, the N PIM signals completely cancel each other, and a PIM magnitude of an entire feed network is the lowest.

Figure 8:
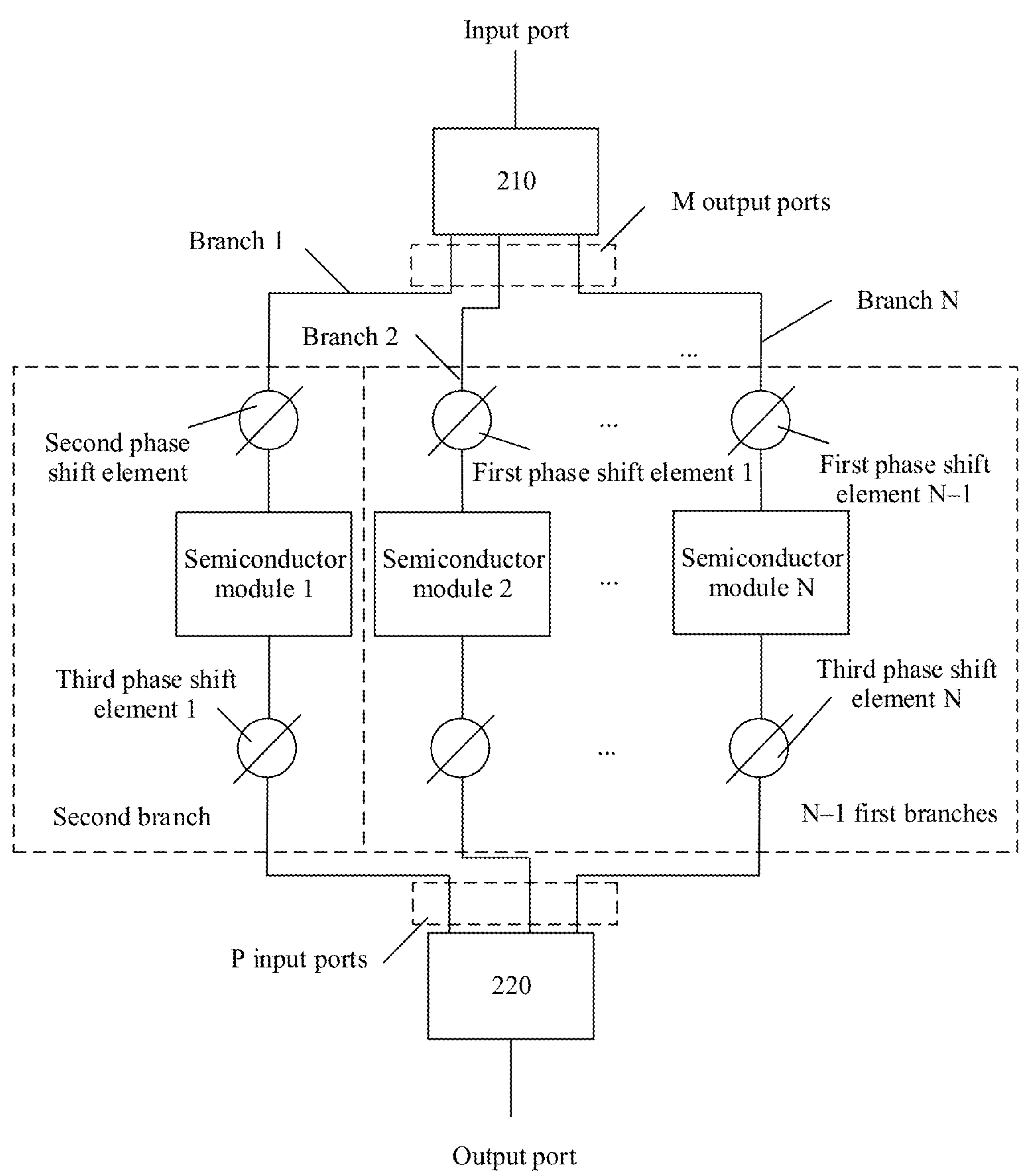
FIG. 8 is a schematic diagram of a structure of a feed circuit 200 according to an embodiment of this disclosure.

FIG. 8 is a schematic diagram of a structure of another feed circuit 200 according to an embodiment of this disclosure. The feed circuit 200 may be applied to the antenna device 11 shown in FIG. 2. The feed circuit 200 shown in FIG. 8 may be a part of the feed circuit in the antenna device 11 shown in FIG. 2, and is configured to implement some functions of the feed circuit.

As shown in FIG. 8, the feed circuit 200 may include a power divider 210, a power combiner 220, and N branches. The power divider 210 includes one input port and M output ports, the power combiner 220 includes P input ports and one output port, N is an integer greater than or equal to 2, and M and P are integers greater than or equal to N. In a structure shown in FIG. 8, P=M=N is used for description. One end of each of the N branches is respectively connected to each of N output ports of the M output ports of the power divider 210, and the other end of each of the N branches is respectively connected to each of N input ports of the P input ports of the power combiner 220. A semiconductor module is disposed on each branch.

As shown in FIG. 8, the N branches may include N−1 first branches and one second branch, and the second branch may be any one of the N branches. In FIG. 8, a leftmost branch 1 serves as an example of the second branch, and a branch 2 to a branch N may serve as the first branches. For example, a branch Q may be a $(Q-1)^{th}$ first branch, and Q is an integer greater than or equal to 2 and less than or equal to N. A first phase shift element may be disposed on each of the N−1 first branches, and the first phase shift element of each first branch may be disposed between the semiconductor module on the first branch and the power divider 210. A third phase shift element may be further disposed on each of the N branches. The third phase shift element on each branch may be disposed between the semiconductor module on the branch and the power combiner 220. The N third phase shift elements are configured to enable phases of electrical signals transmitted on the N branches to be the same at the input ports of the power combiner 220. This effectively reduces a power loss of the electrical signals transmitted on the N branches due to different phases at the input ports of the power combiner 220 during power combination.

In an implementation, for the feed circuit 200 shown in FIG. 8, when the semiconductor module includes a digital phase shifter, the feed circuit 200 serves as a phase shift circuit, and is configured to adjust a phase of an electrical signal fed into an input port. In addition, because the feed circuit provided in this embodiment of this disclosure is split first and then combined, the N branches are disposed between the power divider 210 and the power combiner 220, and a power capacity of the semiconductor module on each branch remains unchanged. Compared with a phase shift circuit that includes only a single branch, the phase shift circuit provided in this embodiment of this disclosure has an increased power capacity.

It should be understood that the output port of the power combiner 220 may be electrically connected to another part of the feed circuit 200. For example, the output port of the power combiner 220 is electrically connected to a frequency modulation circuit. This is not limited in this disclosure.

In an implementation, the power divider 210 is an equal-amplitude power divider, and may divide an electrical signal fed into the input port into N electrical signals that have an equal amplitude and a same phase, and transmit the N electrical signals to the N branches. Alternatively, the power divider 210 is an unequal-amplitude power divider, and may divide an electrical signal fed into the input port into N electrical signals that have a same phase but different amplitudes, and transmit the N electrical signals to the N branches. This is not limited in this disclosure.

In an implementation, a second phase shift element is disposed on the second branch, and a phase of the second phase shift element disposed on the second branch may be α, and α is greater than or equal to 0. A phase reference in the N branches may be adjusted by adjusting the phase α of the second phase shift element disposed on the second branch. Correspondingly, the second branch serves as the reference branch, and phases of the first phase shift elements in the N−1 first branches are respectively Φ/N+α, 2×Φ/N+α, 3×Φ/N+α, . . . , and (N−1)×Φ/N+α, and Φ may be greater than 90° and less than 270°. That is, a phase of a first phase shift element disposed on an $i^{th}$ first branch in the N−1 first branches is i×Φ/N+α, where i is an integer greater than or equal to 1 and less than or equal to N−1.

In this case, to ensure that the phases of the electrical signals transmitted on the N branches are the same at the input ports of the power combiner 220, a phase of the third phase shift element disposed on the second branch may be (N−1)×Φ/N+α. Correspondingly, phases of third phase shift elements on the N−1 first branches are (N−2)×Φ/N+α, (N−3)>Φ/N+α, (N−4)×Φ/N+α, . . . , and α, so that a sum of the phase of the first phase shift element and the phase of the third phase shift element disposed on each of the N−1 first branches and a sum of the phase of the second phase shift element and the phase of the third phase shift element disposed on the second branch are both (N−1)×Φ/N+2α. It should be understood that there may be a plurality of phase setting manners of the third phase shift element. A purpose of the plurality of phase setting manners is that a sum of the phase of the first phase shift element or the second phase shift element disposed on the N branches and the phase of the corresponding third phase shift element is θ, where θ may be any angle (greater than or equal to 0° and less than or equal to 360°), and may be adjusted based on an actual design or production requirement. This is not limited in this disclosure and avoids a power loss caused by different phases that are of electrical signals transmitted on the N branches and that are on the input ports of the power combiner during power combination.

It should be understood that, in this embodiment, the branch 1 is the second branch, and the branch 2 to the branch N are the N−1 first branches. During actual application, the N branches may be arranged on a PCB in a phase sequence (a sequence of phases of the second phase shift elements, for example, an ascending order or a descending order of the phases) or may be arranged randomly. A specific layout manner of the N branches is not limited in this embodiment of this disclosure and may be arranged based on an actual design.

In an implementation, the first phase shift elements, the second phase shift element, and the third phase shift elements are implemented by devices of a same type as the phase shift elements shown in FIG. 4, and the first phase shift elements and the second phase shift element are a delay line, a Schiffman phase shifter, or another structure that generates a phase difference. This is not limited in this disclosure.

In an implementation, no second phase shift element is disposed on the second branch. This is equivalent to that the phase α of the second phase shift element disposed on the second branch in the foregoing embodiment is 0.

Figure 9:
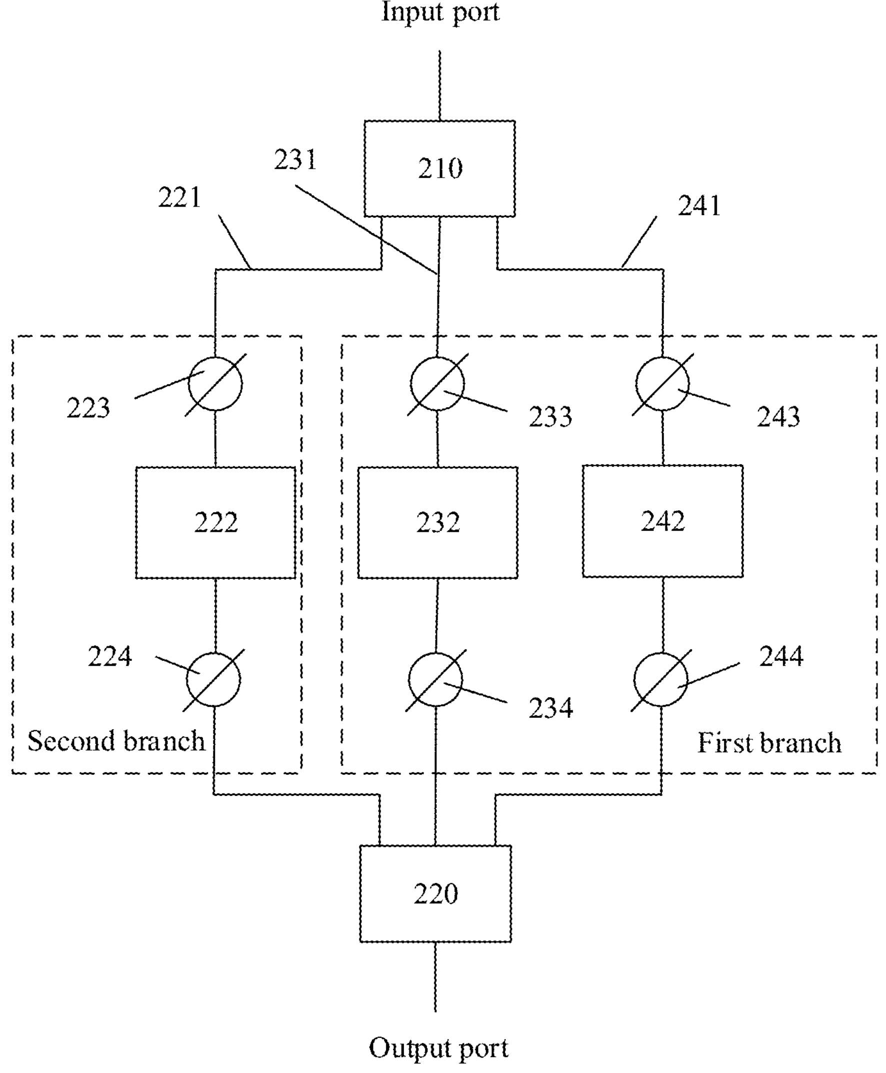
FIG. 9 is a schematic diagram of a structure of another feed circuit according to an embodiment of this disclosure.

In an implementation, that the semiconductor module is a digital phase shifter, P=M=N=3, and the phase of the second phase shift element disposed on the second branch is 0 is used for description. That is, the power divider 210 is a one-to-three power divider, and has one input port and three output ports. The power combiner 220 is a three-in-one power combiner, and has three input ports and one output port. An example in which a feed circuit 200 includes a branch 221, a branch 231, and a branch 241 is used for description, as shown in FIG. 9. The branch 221 is a second branch, and the branch 231 and the branch 241 are first branches.

Figure 10:
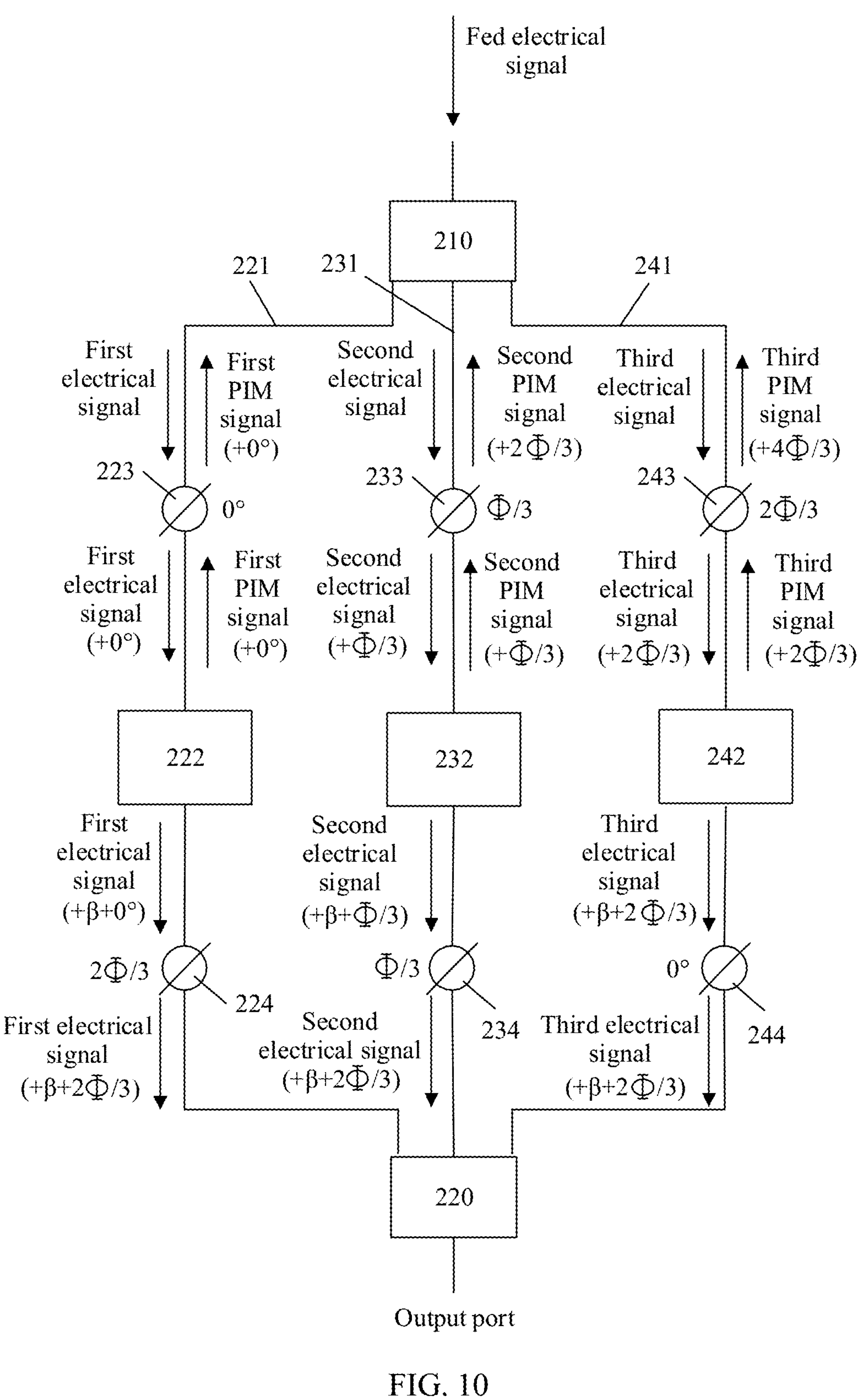
FIG. 10 is a schematic diagram of transmitting electrical signals by a feed circuit according to an embodiment of this disclosure.

As described above, when N=3, the feed circuit 200 includes two first branches (the branch 231 and the branch 241) and one second branch 131 (the branch 221). When a phase of a second phase shift element 223 disposed on the second branch 131 is 0 (which is equivalent to that the second phase shift element 223 is not disposed), a phase of a first phase shift element disposed on an $i^{th}$ first branch is i×Φ/N, the branch 231 may be a $1^{st}$ first branch, a phase of a first phase shift element 233 is Φ/3, the branch 241 may be a $2^{nd}$ first branch, and a phase of a first phase shift element 243 is 2×Φ/3, as shown in FIG. 10. In addition, to enable electrical signals transmitted on the three branches to have a same phase at three input ports of the power combiner 220, a phase of a third phase shift element 224 is 2×Φ/3, a phase of a third phase shift element 234 is Φ/3, and the phase of a third phase shift element is 0.

As shown in FIG. 10, an electrical signal fed into the input port of the power divider 210 is divided into a first electrical signal, a second electrical signal, and a third electrical signal that have a same phase and that are respectively fed into the branch 221, the branch 231, and the branch 241. After the first electrical signal, the second electrical signal, and the third electrical signal respectively pass through the second phase shift element 223, the first phase shift element 233, and the first phase shift element 243, phases of the first electrical signal, the second electrical signal, and the third electrical signal are respectively increased by 0, Φ/3, and 2×Φ/3. The first electrical signal, the second electrical signal, and the third electrical signal are respectively transmitted to a semiconductor module 222, a semiconductor module 232, and a semiconductor element 242, and a reflected first PIM signal, a reflected second PIM signal, and a reflected third PIM signal are generated. Because the first PIM signal, the second PIM signal, and the third PIM signal are generated by reflecting the first electrical signal, the second electrical signal, and the third electrical signal at the semiconductor module on each corresponding branch, phases of the first PIM signal, the second PIM signal, and the third PIM signal are the same as phases of the first electrical signal, the second electrical signal, and the third electrical signal transmitted to the semiconductor modules. Correspondingly, phase differences between the first PIM signal, the second PIM signal, and the third PIM signal are the same as phase differences between the first electrical signal, the second electrical signal, and the third electrical signal. However, in paths in which the first PIM signal, the second PIM signal, and the third PIM signal are transmitted to the output ports of the power divider 210, the first PIM signal, the second PIM signal, and the third PIM signal need to pass through the second phase shift element 223, the first phase shift element 233, and the first phase shift element 243, and the phases of the first PIM signal, the second PIM signal, and the third PIM signal are respectively increased by 0, Φ/3, and 2×Φ/3. Therefore, a phase difference between the first PIM signal and the second PIM signal at the output ports of the power divider 210 and a phase difference between the second PIM signal and the third PIM signal at the output ports of the power divider 210 are both 2×Φ/3, and the first PIM signal, the second PIM signal, and the third PIM signal may at least partially cancel each other at the output ports of the power divider 210.

When the semiconductor module 222, the semiconductor module 232, and the semiconductor element 242 are digital phase shifters, after the first electrical signal, the second electrical signal, and the third electrical signal pass through the semiconductor module 222, the semiconductor module 232, and the semiconductor element 242, the phases may be increased by β, where β may be any angle (greater than or equal to 0° and less than or equal to 360°), and may be adjusted based on an actual design or production requirement. This is not limited in this disclosure. After the first electrical signal, the second electrical signal, and the third electrical signal pass through the third phase shift element 224, the third phase shift element 234, and the third phase shift element 244, the phases of the first electrical signal, the second electrical signal, and the third electrical signal are respectively increased by 2×Φ/3, Φ/3, and 0. Therefore, compared with at the output ports of the power divider 210, at the input ports of the power combiner 220, the phases of the first electrical signal, the second electrical signal, and the third electrical signal generated by the first phase shift elements (or the second phase shift element), the semiconductor modules, and the third phase shift elements between the power divider 210 and the power combiner 220 are all changed to 2×Φ/3+β, so that phases of the electrical signals transmitted on the three branches are the same at the input ports of the power combiner 220. This avoids a power loss caused by different phases during power combination.

At the output ports of the power divider 210, it may be learned from vector synthesis with reference to the description of FIG. 7 to enable at least partial cancellation between the first PIM signal, the second PIM signal, and the third PIM signal, to improve a PIM indicator of an entire feed network, Φ needs to be greater than 90° and less than 270°.

Similar to the embodiment in FIG. 4, when a sum of vectors of the first PIM signal, the second PIM signal, and the third PIM signal is zero, the first PIM signal, the second PIM signal, and the third PIM signal completely cancel each other, and a PIM magnitude of the feed network is the lowest. Correspondingly, to make the sum of the vectors of the first PIM signal, the second PIM signal, and the third PIM signal zero, the power divider 210 needs to be an equal-amplitude power divider, so that the first PIM signal, the second PIM signal, and the third PIM signal have an equal amplitude and Φ is 180°. In this case, a phase of the first PIM signal is 0, a phase of the second PIM signal is 120°, a phase of the third PIM signal is 240°, and a phase difference between the first PIM signal and the second PIM signal and a phase difference between the second PIM signal and the third PIM signal are both 120°, so that the sum of the vectors of the first PIM signal, the second PIM signal, and the third PIM signal is zero.

A person skilled in the art may use different methods to implement the described functions for each specific application, but such implementation should not be considered beyond the scope of this disclosure.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In the several embodiments provided in this disclosure, it should be understood that the disclosed system, and apparatus may be implemented in another manner. For example, the described apparatus embodiments are only examples. For example, division into the units is only logical function division or may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, or another form.

The foregoing descriptions are only specific implementations and are not intended to limit the scope of this disclosure. Any variation or replacement readily determinable by a person skilled in the technical filed of this disclosure is intended to be encompassed by the scope of protection afforded by the accompanying claims.

What is claimed is:

1. A feed circuit, comprising:

a power divider having N branches, wherein Nis an integer greater than or equal to 2, the power divider including one input port and M output ports, wherein M is an integer greater than or equal to N, and the N branches are respectively connected to N output ports of the M output ports of the power divider, the N branches comprising N−1 first branches and one second branch;

a semiconductor module disposed on each of the N branches; and a first phase shift element disposed on each of the N−1 first branches, the first phase shift element being disposed between the semiconductor module and the power divider, and the N−1 first phase shift elements being configured to generate a fixed phase difference between the N branches.

2. The feed circuit according to claim 1, wherein the second branch serves as a reference branch whose phase returns to zero in the N branches.

3. The feed circuit according to claim 1, wherein a second phase shift element is disposed on the second branch.

4. The feed circuit according to claim 3, wherein a phase of a first phase shift element disposed on an $i^{th}$ first branch in the N−1 first branches is $i \times \Phi/N+\alpha$, where i is an integer greater than or equal to 1 and less than or equal to N−1, $\Phi$ is greater than 90° and less than 270°, $\alpha$ is a phase of the second phase shift element, and $\alpha$ is greater than or equal to 0.

5. The feed circuit according to claim 1, wherein a phase of a first phase shift element disposed on an $i^{th}$ first branch in the N−1 first branches is $i \times \Phi/N$, where i is an integer greater than or equal to 1 and less than or equal to N−1, and $\Phi$ is greater than 90° and less than 270°.

6. The feeding circuit according to claim 4, wherein $\Phi$ is 180°.

7. The feed circuit according to claim 1, wherein the power divider is an equal-amplitude power divider.

8. The feed circuit according to claim 1, further comprising:

a power combiner comprising P input ports and one output port, where P is an integer greater than or equal to N, the N branches being further respectively connected to N input ports of the P input ports of the power combiner; and a third phase shift element disposed on each of the N branches, the third phase shift element being disposed between the semiconductor module and the power combiner, the N third phase shift elements being configured to enable phases of electrical signals transmitted on the N branches to be the same at input ports of the power combiner.

9. The feed circuit according to claim 8, wherein sums of phases of the first phase shift elements disposed on the N−1 first branches and a phase of the corresponding second phase shift element each are $\theta$, where $\theta$ is greater than or equal to 0° and less than or equal to 360°.

10. The feed circuit according to claim 8, wherein the third phase shift element is a delay line or a Schiffman phase shifter.

11. The feed circuit according to claim 1, wherein the semiconductor module is a digital phase shifter.

12. The feed circuit according to claim 11, wherein the digital phase shifter comprises a diode or a micro-electro-mechanical system.

13. The feed circuit according to claim 1, wherein the first phase shift element is a delay line or a Schiffman phase shifter.

14. An antenna device, comprising:

a feed circuit, wherein the feed circuit comprises:

a power divider having N branches, wherein N is an integer greater than or equal to 2, the power divider including one input port and M output ports, wherein M is an integer greater than or equal to N, and the N branches are respectively connected to N output ports of the M output ports of the power divider, the N branches comprising N−1 first branches and one second branch;

a semiconductor module disposed on each of the N branches; and a first phase shift element disposed on each of the N−1 first branches, the first phase shift element being disposed between the semiconductor module and the power divider, and the N−1 first phase shift elements being configured to generate a fixed phase difference between the N branches.

15. The antenna device according to claim 14, further comprising:

a radiator connected to the input port of the power divider in the feed circuit.

16. The antenna device according to claim 14, wherein the second branch serves as a reference branch whose phase returns to zero in the N branches.

17. The antenna device according to claim 14, wherein a phase of a first phase shift element disposed on an $i^{th}$ first branch in the N−1 first branches is $i \times \Phi/N$, where i is an integer greater than or equal to 1 and less than or equal to N−1, and $\Phi$ is greater than 90° and less than 270°.

18. A communication system, comprising:

an antenna device having a feed circuit, comprising:

a power divider having N branches, wherein N is an integer greater than or equal to 2, the power divider including one input port and M output ports, wherein M is an integer greater than or equal to N, and the N branches are respectively connected to N output ports of the M output ports of the power divider, the N branches comprising N−1 first branches and one second branch;

a semiconductor module disposed on each of the N branches; and a first phase shift element disposed on each of the N−1 first branches, the first phase shift element being disposed between the semiconductor module and the power divider, and the N−1 first phase shift elements being configured to generate a fixed phase difference between the N branches.

19. The communication system according to claim 18, wherein the antenna device further comprises a radiator connected to the input port of the power divider in the feed circuit.

20. The communication system according to claim 18, wherein the second branch serves as a reference branch whose phase returns to zero in the N branches.

* * * * *